Dec. 15, 1964     C. E. JOHANSSON     3,161,151
FLAT CARS AND CRADLES THEREFOR
Filed Oct. 12, 1961     11 Sheets-Sheet 4
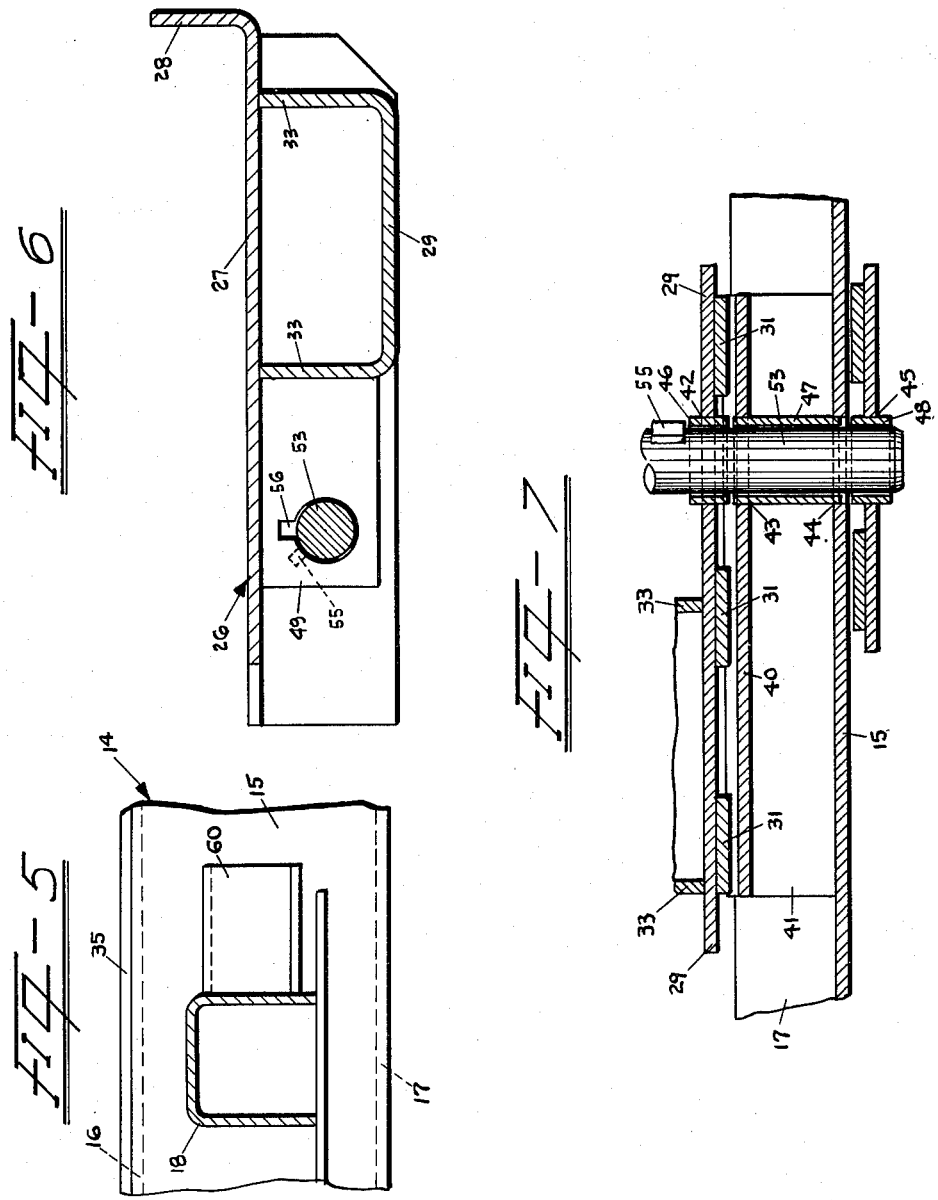
INVENTOR:
CARL E. JOHANSSON
BY~
Samuel Reese

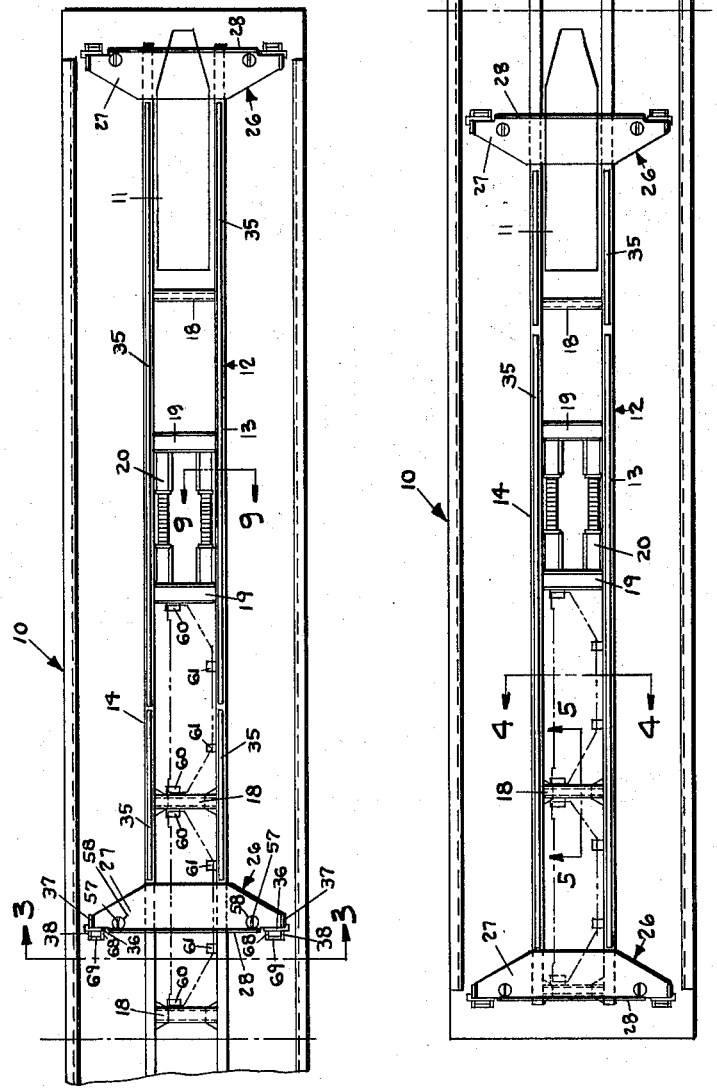

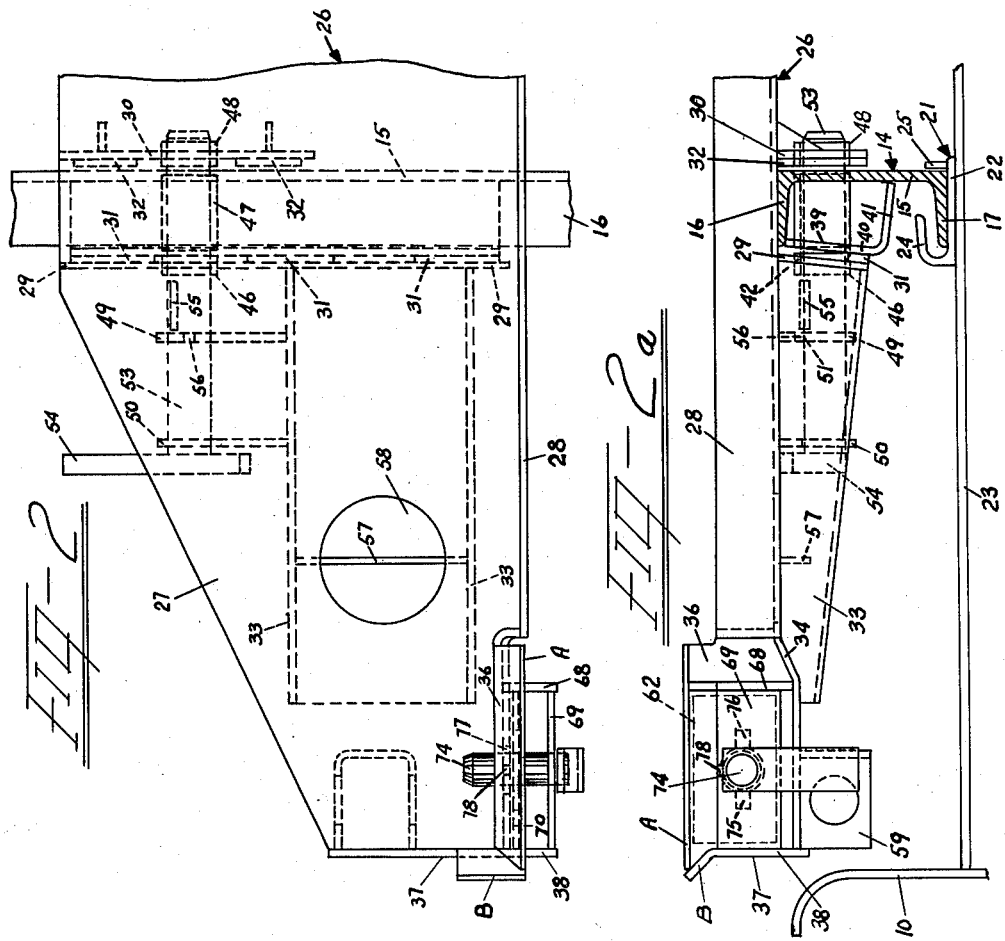

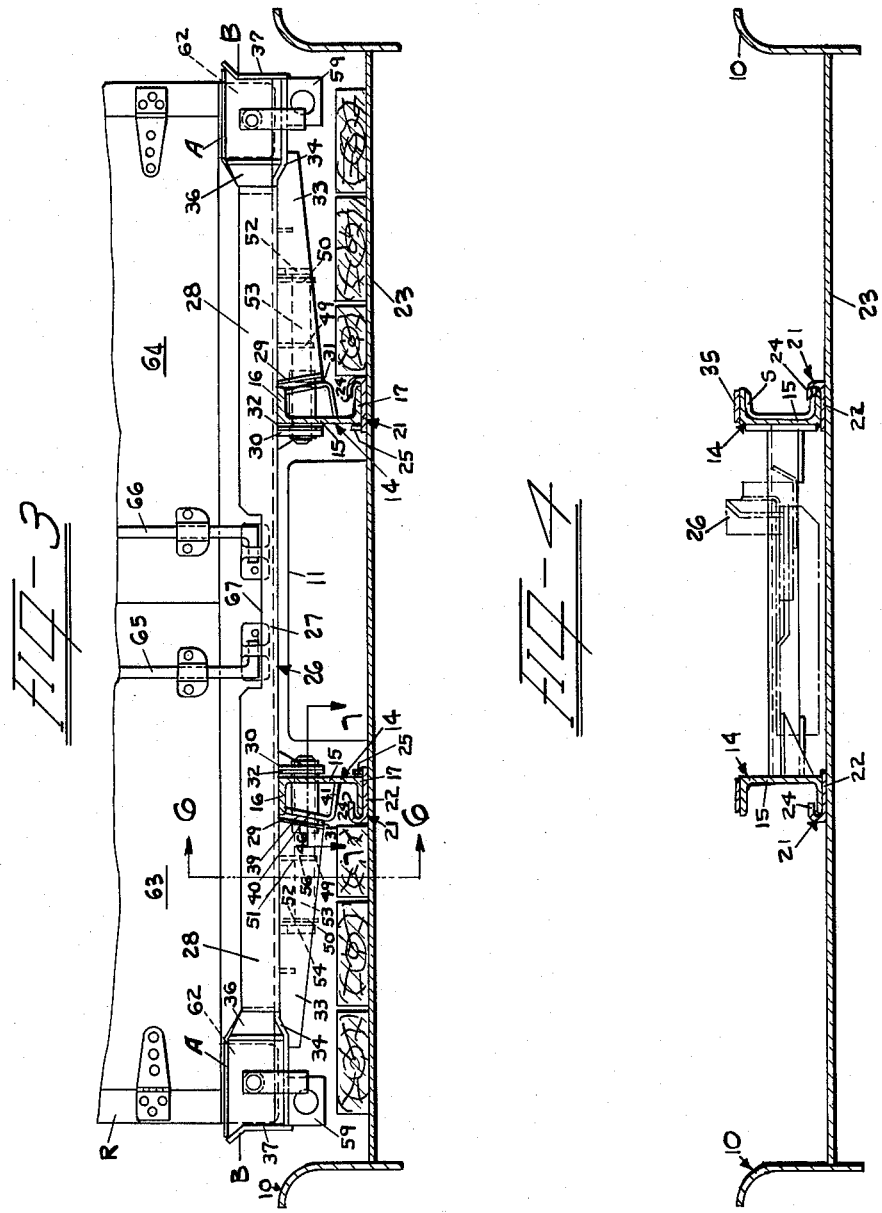

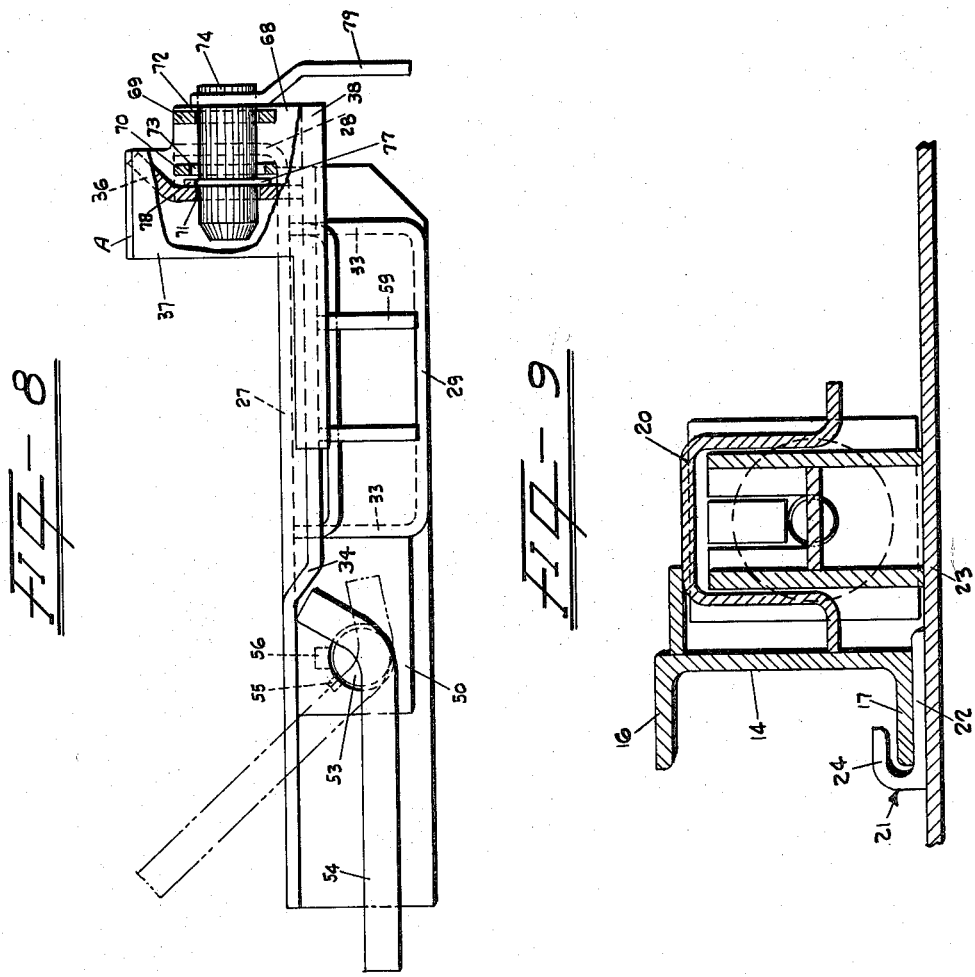

Dec. 15, 1964  C. E. JOHANSSON  3,161,151
FLAT CARS AND CRADLES THEREFOR
Filed Oct. 12, 1961  11 Sheets-Sheet 6
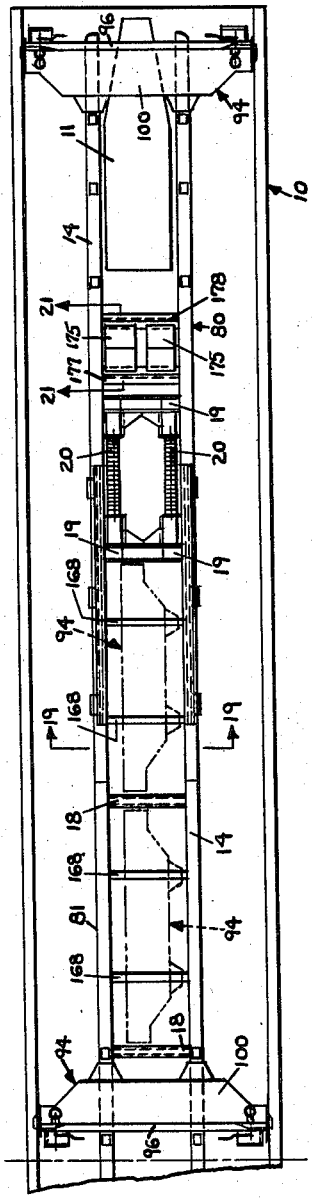
INVENTOR
CARL. E. JOHANSSON
BY - Samuel Reese
ATTY.

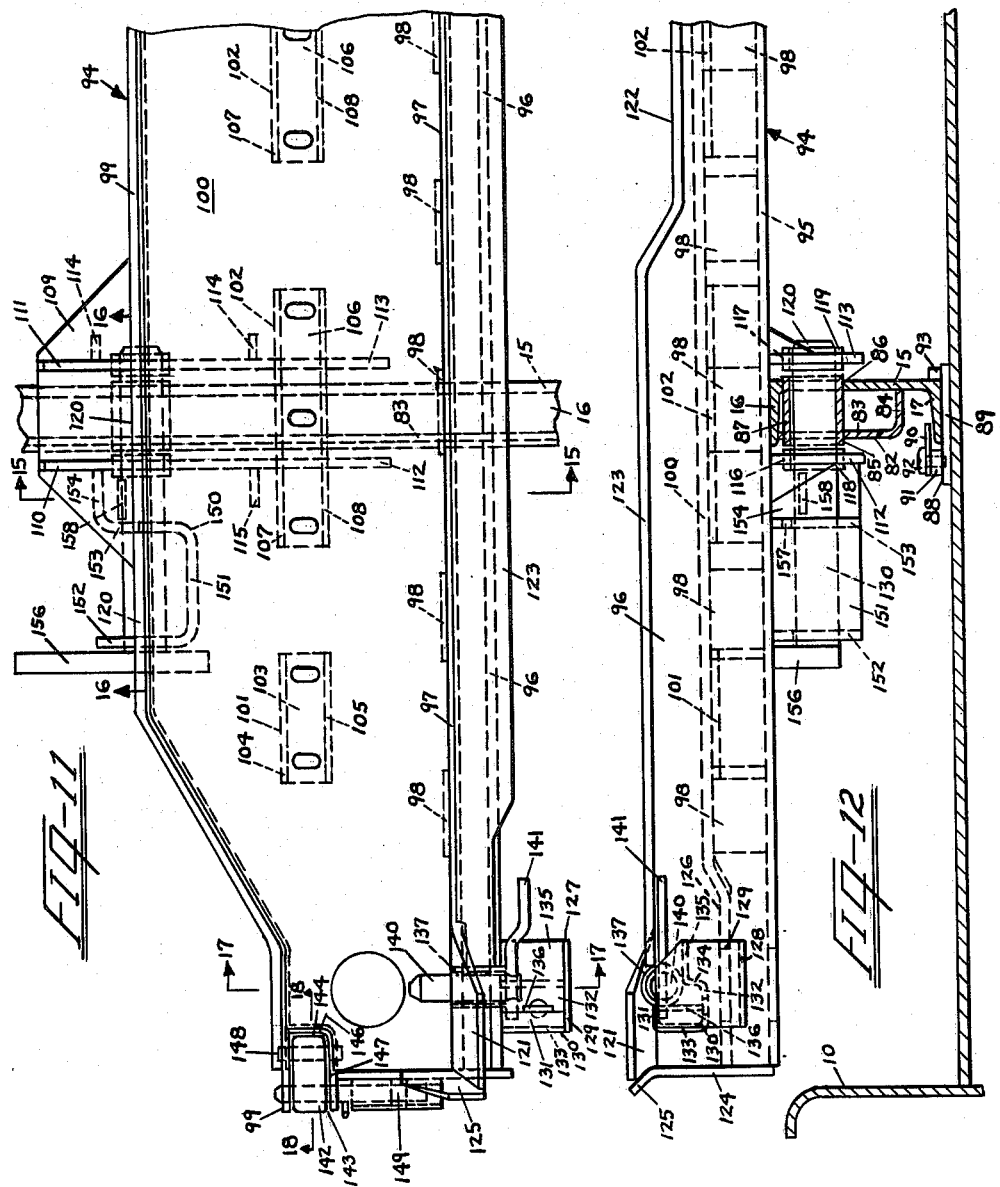

Dec. 15, 1964 C. E. JOHANSSON 3,161,151
FLAT CARS AND CRADLES THEREFOR
Filed Oct. 12, 1961 11 Sheets-Sheet 8
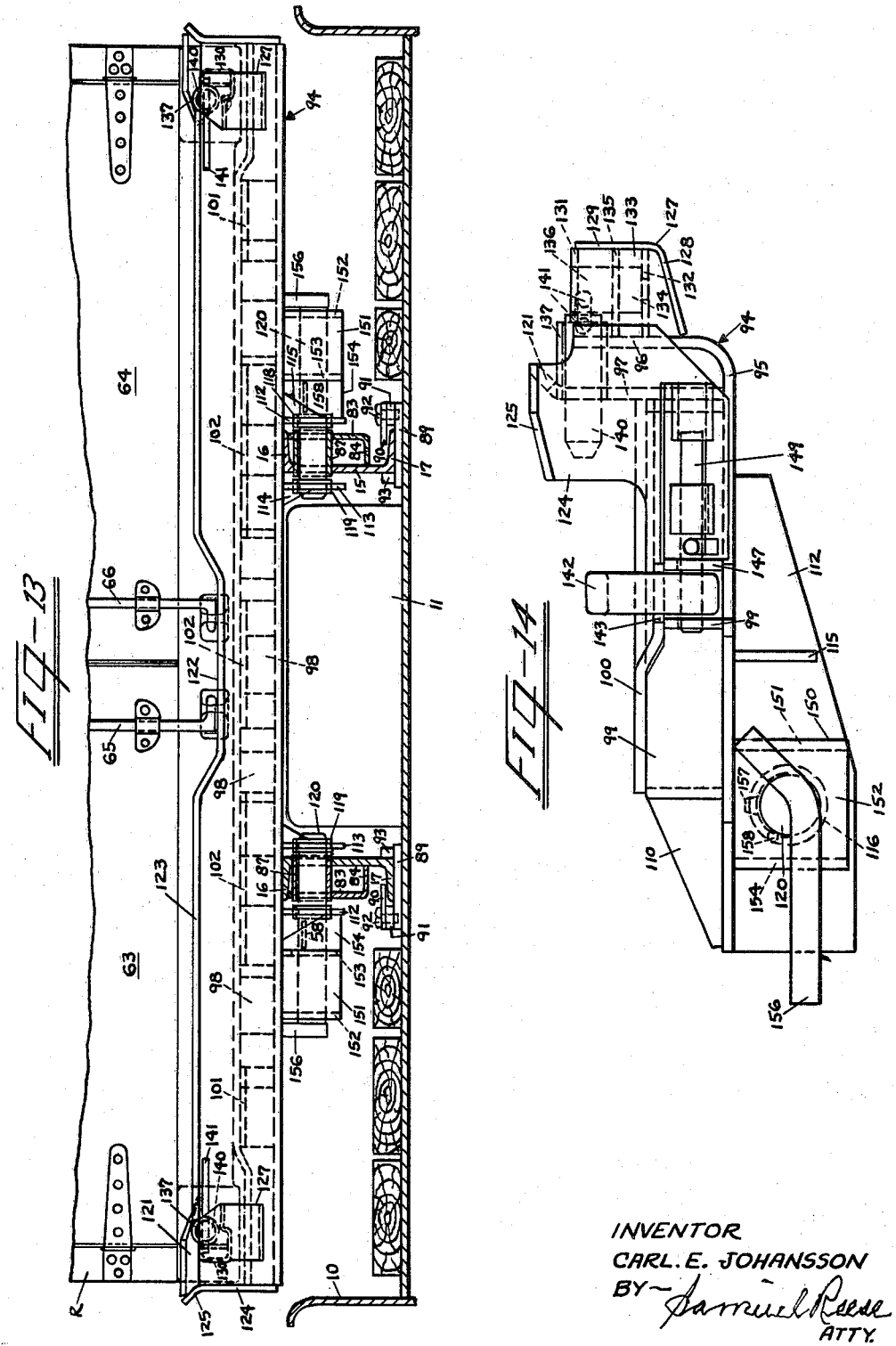
INVENTOR
CARL. E. JOHANSSON
BY Samuel Reese
ATTY.

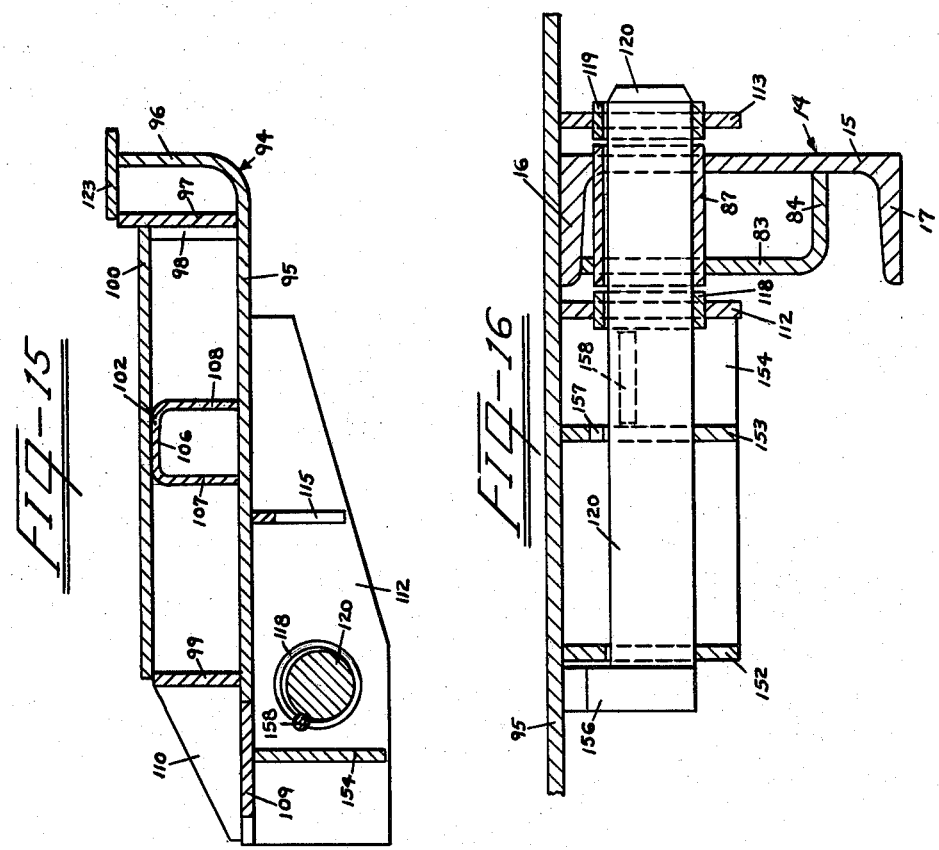

Dec. 15, 1964  C. E. JOHANSSON  3,161,151
FLAT CARS AND CRADLES THEREFOR
Filed Oct. 12, 1961  11 Sheets-Sheet 10
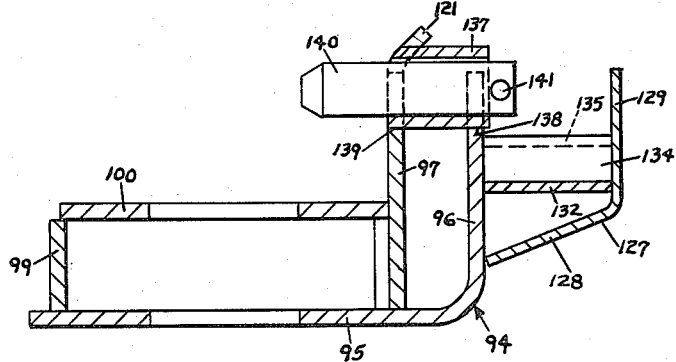
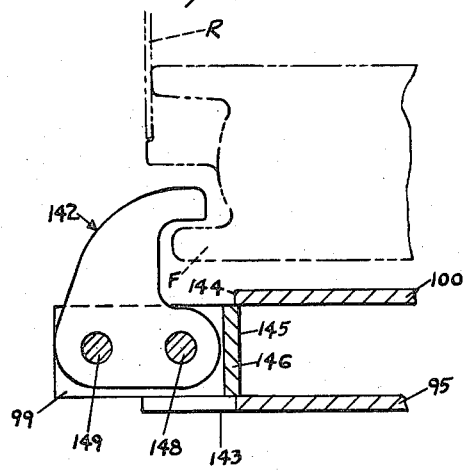
INVENTOR
CARL E. JOHANSSON
BY— *Samuel Reese*
ATTY.

Dec. 15, 1964  C. E. JOHANSSON  3,161,151
FLAT CARS AND CRADLES THEREFOR
Filed Oct. 12, 1961  11 Sheets-Sheet 11
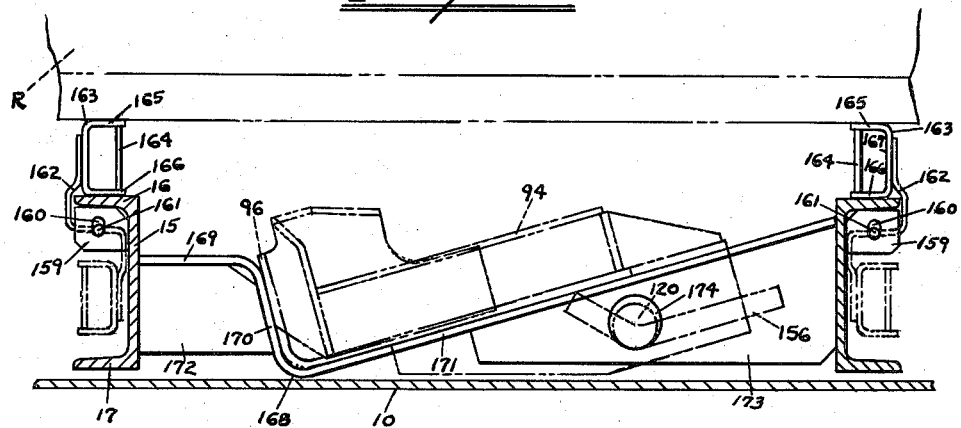
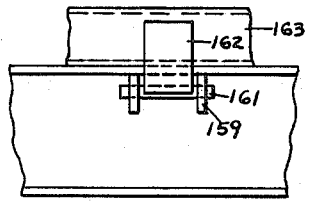
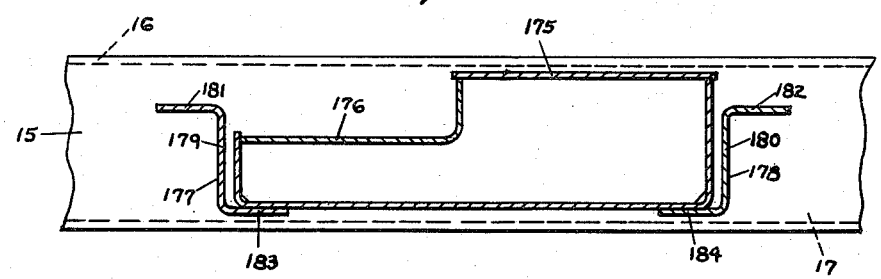
INVENTOR
CARL. E. JOHANSSON
BY— Samuel Reese
ATTY.

United States Patent Office 3,161,151
Patented Dec. 15, 1964

3,161,151
FLAT CARS AND CRADLES THEREFOR
Carl E. Johansson, Cleveland, Ohio, assignor to The Youngstown Steel Door Company, Cleveland, Ohio, a corporation of Ohio
Filed Oct. 12, 1961, Ser. No. 147,701
10 Claims. (Cl. 105—368)

This invention relates to flat cars and cradles therefor and is directed more particularly to the construction of such cradles and to the securement thereof upon flat cars.

It is an object of this invention to provide flat cars equipped with cradles wherein the latter shall become a permanent part of the car.

A further object is to provide flat cars equipped with cradles wherein the latter shall become a permanent part of the car and shall be capable of longitudinal movement along the car.

A further object is to provide flat cars equipped with cradles of such construction that the cars shall be capable of carrying containers or trailers or both containers and trailers at the same time without having to remove the cradles from the cars.

A further object is to provide cradles of novel construction for supporting containers for shipment upon flat cars.

A further object is to provide cradles of novel construction for supporting containers for shipment upon flat cars wherein parts of the cradles are removable and the cradles so constructed that the removable parts can be stored thereon whereby trailers can be carried on the cars while the cradles remain on the cars.

A further object is to provide cradles for flat cars which shall embody removably secured bolsters.

A further object is to provide cradles for flat cars embodying frames and cross bolsters removably secured to and extending beyond the frame wherein the frame is so constructed and the cross bolsters so related thereto that bending of the extending portions of the cross bolsters under the weight of containers supported upon the cradles is prevented.

A further object is to provide container carrying cradles for flat cars embodying cross bolsters so constructed that doors on the containers may be opened while the containers are on the cradles.

A further object is to provide container carrying cradles for flat cars embodying cross bolsters so designed as to be applicable to both low deck and high deck flat cars while maintaining adequate clearance between containers supported thereon and overhead bridges.

A further object is to provide container carrying cradles for flat cars embodying cross bolsters wherein the cradles shall incorporate supports for the intermediate portions of the cradles.

A further object is to provide container carrying cradles for flat cars embodying cross bolsters wherein the cradles shall include means permitting storage of chock blocks adapted to support container landing gear.

A further object is to provide container carrying cradles for flat cars embodying frames and cross bolsters wherein the frames shall include means for storing the cross bolsters which shall prevent projection of the cross bolsters above the frame.

Other objects of the invention will become clear as the description thereof proceeds.

In the drawings forming part of this specification:

FIG. 1 is a plan view of a flat car having a cradle embodying the instant invention mounted thereon.

FIG. 2 is an enlarged plan view of a portion of the structure of FIG. 1.

FIG. 2a is a front elevation of the structure of FIG. 2.

FIG. 3 is a vertical section taken on line 3—3 of FIG. 1.

FIG. 4 is a vertical section taken on line 4—4 of FIG. 1.

FIG. 5 is a vertical section taken on line 5—5 of FIG. 1.

FIG. 6 is a vertical section taken on line 6—6 of FIG. 3.

FIG. 7 is a vertical section taken on line 7—7 of FIG. 6.

FIG. 8 is an end view of the bolster looking from the left in FIG. 3 a portion being broken away to permit full line showing of other parts of the bolster.

FIG. 9 is a vertical section taken on line 9—9 of FIG. 1.

FIG. 10 is a view similar to FIG. 1 showing a modified form of the cradle.

FIG. 11 is a view similar to FIG. 2 of the cradle shown in FIG. 10.

FIG. 12 is a view similar to FIG. 2a of the modified cradle.

FIG. 13 is a view similar to FIG. 3 of the modified cradle.

FIG. 14 is an end elevation of the cross bolster shown in FIG. 11.

FIG. 15 is a vertical section taken on line 15—15 of FIG. 11.

FIG. 16 is a vertical section taken on line 16—16 of FIG. 11.

FIG. 17 is a vertical section taken on line 17—17 of FIG. 11.

FIG. 18 is a vertical section taken on line 18—18 of FIG. 11.

FIG. 19 is a vertical section taken on line 19—19 of FIG. 10.

FIG. 20 is a side elevation of FIG. 19.

FIG. 21 is a vertical section taken on line 21—21 of FIG. 10.

Referring to the drawings, the numeral 10 designates a flat car used in the shipment of containers and truck trailers. These cars vary in length, the car shown in the drawings being 85 feet long. To adapt these cars for the hauling of truck trailers, that is, vehicle bodies having wheels fastened to the rear of the bodies, they are provided with hitches 11 which are fastened to and support the front end of the truck trailers on the cars. The hitches are hinged at one end to the floor of the cars and normally lie flatwise upon the floor.

To adapt the flat cars for the transportation of containers, that is, vehicle bodies without wheels, cradles 12 embodying the instant invention are provided. Each cradle is so devised that it becomes a permanent part of the car and imparts thereto the capability of hauling all-container loads or all-trailer loads or loads made up of containers and trailers. The cradle 12 comprises a frame 13 having side members formed of spaced outwardly facing channels 14 extending lengthwise of the car. The channels 14 are preferably similar and are rolled members so positioned on the car 10 that their webs 15 are vertical and their flanges 16 and 17 extend in opposite directions. The channels 14 lie on opposite sides of the hitches 11 so as not to interfere with the swinging of the hitches to vertical position. For ease of production the side members are formed of a plurality of channels spliced together as shown at S.

The side members of the cradle are connected by spaced cross-members 18, preferably in the form of downwardly opening channels. Additional cross-members 19, preferably in the form of I-beams, spaced from each other also extend between and are secured to the side members. The cross-members 19 are utilized in connection with shock absorbers indicated generally by the reference numeral 20. The shock absorbers, which per se do not form a part of the instant invention, serve to permit cushioned movement of the cradle lengthwise of the car.

To allow such movement of the cradle while preventing upward movement thereof and movement crosswise of the car, brackets 21 are utilized. These brackets are preferably formed of plate members having a flange 22 resting upon and secured to the floor 23 of the car. At its outer end the flange 23 is bent to provide a flange 24 spaced from an doverlapping the flange 22. The channels 14 rest upon the flanges 22 of the brackets with the channel flanges 17 extending under the flanges 24. Flanges 24 thereby serve to prevent upward movement of the cradle and movement thereof crosswise of the car. Abutments 25 fastened to the flanges 24 adjacent to the webs 15 also serve to prevent crosswise movement of the cradle.

The cradle 12 also comprises spaced bolsters 26, their number depending upon the length of the cradle. The illustrated cradle is of such length as to carry four bolsters. The bolsters rest upon and extend crosswise of the frame 13 beyond the channels 14. Each bolster is formed of a supporting plate 27 one side of which is turned upwardly to provide a flange 28. The supporting plate 27 is reinforced by plates 29 and 30 which are secured, as by welding, to the underside of plate 27. The plates 29 and 30 extend crosswise of plate 27 and straddle the channels 14. These plates are reinforced and their thickness increased by the addition of plates 31 welded to the lower portion of plates 29 and by plates 32 welded to the underside of the supporting plate 27 and to the plate 30. As shown, the plates 29 and 31 are preferably inclined downwardly and outwardly. The supporting plate 27 is further reinforced by plates 33 which extend lengthwise of plate 27. Plates 33 are welded to the underside of plate 27, and abut and are welded to plates 29.

Reinforcing plates 33 terminate short of the ends of plate 27. These ends are offset downwardly as indicated at 34 to insure that the containers supported on the bolsters will be supported evenly. This is further insured by fastening plates 35 having the same thickness as the supporting plates 27 upon the flanges 16 of the side channels 14. The upstanding side flange 28 of plate 27 is removed from the depressed end of the bolster. To compensate for the loss of strength occasioned thereby a lengthwise extending plate 36 is welded to the depressed end and extends upwardly therefrom. A plate 37 is welded to the transverse end of the plate 27 and extends upwardly from plate 27. Plate 36 abuts and is welded to plate 37. The upper portions of plates 36 and 37 are inclined outwardly as shown at A and B so that plates 36 and 37 not only serve to reinforce the ends of plate 27, but also to guide and retain containers upon the plates 27 of the bolsters. The plate 37 extends outwardly beyond plate 27 as shown at 38.

In order that the cradle may become a permanent part of the car and the car acquire the capability of carrying trailers as well as containers, the bolsters 26 are releasably secured to the frame 13 and the latter is so constructed to permit storing of the bolsters. To these ends and to permit easy placement of the bolsters on the channels 14 a member 39 is provided for each channel 14 having a portion 40 welded to flange 16 and extending downwardly and outwardly of channel 14. Portion 40 is flanged inwardly to provide a portion 41 which abuts and is welded to web 15. Plate 29, portion 40, web 15 and plate 30 are provided with aligned openings 42, 43, 44 and 45, within which sleeves 46, 47, and 48 are welded. Additional plates 49 and 50 are welded to the bottom of supporting plate 27 and are provided with openings 51 and 52 alined with the sleeves 46, 47 and 48.

A locking bolt 53 operable by a lever 54 secured to the outer end thereof is slidably and rotatably carried by the sleeves and the plates 49 and 50. The locking bolt carries a projection 55 located between plate 49 and sleeve 46 when the bolt is in projected position. Plate 49 is formed with a slot 56 somewhat larger than and of the same shape as the projection 55 and through which the projection can pass. In its projected or locking position the projection 55 is displaced relative to the slot 56 so that the bolt cannot be retracted. To release the bolster from the channels 14 the locking bolt is rotated by the lever 54 until the projection 55 registers with the slot 56 whereupon the bolt can be retracted. Withdrawal of the locking bolt is limited by the engagement of the projection 55 with plate 50 which also serves to retain the bolt on the bolster.

When the locking bolts have been retracted the bolster may be lifted from the channels 14 by the plates 57 welded to the underside of the supporting plate 27 and accessible through openings 58 provided in the plate or by the lifting plates 59 welded to the underside of plate 27 at the ends of the plate. After the bolster has been lifted from the channels 14 it is stored upon the frame 13. For this purpose longitudinally alined preferably similar angular brackets 60 are secured to adjacent cross members. A substantially T-shaped bracket 61 is secured to one of the channels 14 midway between the brackets 60. These brackets serve to support and store the bolster upon the frame 13 so that the car can now receive trailers while the bolster is always available whenever it is desired to haul containers on the car. When trailers have been run on to the car the hitches 11 may be swung upward for engagement with the trailers without interference from the bolster. The cradle thus forms a permanent part of the car.

When it is desired to haul containers on the car the bolsters are reseated upon the channels 14 and locked thereto. In the reseating of the bolsters the inclined portion provides clearance between plate 29 and flange 16 of the channels 14 so as to prevent damage thereto. As the bolster is lowered upon the channels the portion of plate 29 which is of greater thickness engages the inclined portion 40 and the bolster is guided to position. In lowered position the lower portion of plate 29 abuts inclined portion 40 in proximity to the flange 41 of member 39. Stresses imposed upon the portions of bolster 26 which overhang the channels 14 are thus transmitted through flange 41 directly to the web 15 of the channels.

FIG. 3 of the drawings illustrates a refrigerator container R mounted upon a cradle and its relationship to a bolster. Castings 62 are provided at the lower corners of the container and are received in and space above the depressed end of the container. The bottom of the container is thereby supported evenly upon the supporting plate 27 of the bolster and the plates 35.

The container R is provided with hinged end doors 63 and 64 which are locked by rotatable locking devices 65 and 66 to the container above and below the doors. When the container is seated upon the bolster the lower portion of the container and the locking devices lie behind the upstanding bolster flange 28 while the doors lie above this flange. To prevent spoilage of the contents of the container in the event of failure of the refrigeration device in the container the bolster is so constructed that the doors can be swung open and Dry Ice placed in the container without removing the container from the cradle. To this end a portion of the flange 28 in the vicinity of the locking devices is removed, as shown at 67, whereupon the lower portions of the locking devices will clear the flange 28 when the doors are swung open.

Each of the lower corners of the container is tied to the bolster so as to shift longitudinally of the car with the cradle when the car is subjected to impact. To accomplish this a plate 68 is welded to the supporting plate 27 and to the plate 36 and extends outwardly therefrom in spaced parallel relationship to the extension 38 of plate 37. A plate 69 parallel to and spaced from plate 36 extends between and is welded to extension 38 and plate 68. A plate 70 is disposed between and is parallel to plates 36 and 69. Plate 70 is welded at its ends to extension 38 and to plate 68.

Alined openings 71, 72 and 73 are formed in plates 36, 69 and 70 through which a rotatable locking bolt 74 is adapted to project into an opening (not shown) in a lower corner casting 62 of the container to lock the container to the bolster. To permit locking of the container to the bolster while preventing accidental unlocking thereof the plate 70 is formed with alined slots 75 and 76 extending oppositely from the opening 73. A collar 77 is welded upon the locking bolt 74. Collar 77 is formed with a projection 78 similar in contour to the slots 75 and 76 and somewhat smaller than these slots so that it can pass through them.

The container is shown locked to the bolster. The locking bolt is projected through the alined openings in the described plates and the container. Projection of the locking bolt is accomplished by a lever 79 secured to the bolt. In the projected position of the locking bolt the projection 78 lies behind plate 70 preventing retraction of the locking bolt. To unlock the container from the bolster so that it can be removed from the cradle the locking bolt is rotated by the lever until the projection 78 registers with one of the slots 75 and 76. The locking bolt can then be retracted, retraction thereof being limited by the engagement of the projection with plate 69.

To lock the container to the bolster the locking bolt is rotated to register the projection 78 with either of the slots 75 or 76 and the bolt projected through the alined openings. Rotation of the locking bolt at this time displaces the projection relative to the slots into overlapping relationship with plate 70 and the container is locked to the bolster.

Another embodiment of the instant invention is shown in FIGS. 10–20 of the drawings. The cradle 80 of this embodiment comprises a frame 81 which utilizes the outwardly opening channels 14 of the first described embodiment of the invention. These channels lie on opposite sides of the trailer hitches 11 and are connected by the spaced channel cross-members 18 and by cross-members 19 of the I-section between which the shock absorbers 20 are disposed. An angle member 82 is carried by each of the channels 14. Each angle member 82 has a vertical leg 83 welded to the underside of flange 16 of channel 14 and a horizontal leg 84 welded to the web 15 thereof. Alined openings 85 and 86 formed in leg 83 and web 15 receive a sleeve 87 through which a locking bolt is adapted to project, as hereinafter described.

The frame 81 is secured upon the car 10 by means of brackets 88, which permit lengthwise movement of the cradle 80 but restrict its crosswise and upward movements. The brackets include plates 89 disposed upon the floor of the car and upon which the lower flanges 17 of the channels 14 are seated. Plates 90, spaced from the plates 89 by fillers 91, overlie the flanges 17 and prevent upward movement of the cradle. The plates 89 and 90 and the filler 91 are secured together by means of bolts 92 which are preferably tack welded to the plates 90. The fillers 91 and members 93, welded to plates 89 on the opposite side of channels 14, restrict crosswise movement of the cradle on the car. Thus, while the cradle becomes a permanent part of the car it can, if damaged, be removed for repair or replacement.

The cradle 80 includes a plurality of spaced cross bolsters 94 releasably secured upon and extending beyond the channels 14. Each bolster is formed of a bottom plate member 95 one side of which is flanged upwardly as shown at 96. A vertical plate member 97, which is preferably coextensive with the flange 96, is welded to the plate member 95 in spaced relationship to the flange 96. The plate member 97 carries a plurality of spaced supporting members 98. A vertical plate member 99 is welded to and along the opposite side of the bottom bolster plate 95. The plate member 99 is of the same height as the supporting members 98 and serves together with the members 98 to support the upper plate 100 of the bolster.

The upper bolster plate member 100 is welded upon the supporting plates 98 and 99. Plate member 100 is additionally supported upon and tied in structurally with the bottom plate member 95 by spaced channel members 101 and 102 extending symmetrically lengthwise of the bolster. Accordingly, a channel member 102 extends across each of the channels 14 of the frame 81.

The two channel members 101 are arranged so that the upper bolster plate member 100 rests upon and is plug welded to the webs 103 of these channel members. The flanges 104 and 105 of these channel members extend downwardly from the webs 103 and are seated upon the bottom bolster plate members 95 to which they are welded. Similarly, the channel members 102 have a web 106 upon which the upper bolster plate member 100 is plug welded and downwardly extending flanges 107 and 108 welded upon the bottom bolster plate member 95. In this manner the bolster plate members are properly spaced and tied together so that they function as a unitary member.

At each of the channels 14 an extension plate member 109 is welded to the edge of the bottom plate member 95 so as to lie upon a channel member 14. Plate members 109 are reinforced by gussets 110 and 111 welded to them and to the plate member 99. The gussets 110 and 111 lie on opposite sides of the channels 14 and in vertical alinement with plate members 112 and 113 welded to the underside of the bottom bolster plate member 95.

The plate members 112 and 113, which are reinforced by gussets 114 and 115, lie adjacent to the opposite sides of the channels 14. These plate members are formed with openings 116 and 117, alined with the openings 85 and 86, within which sleeves 118 and 119 are welded. Sleeves 87, 118 and 119 are adapted to receive slidable and rotatable locking bolts 120 by means of which the bolsters are releasably secured upon the channels 14 of the frame 81.

Adjacent to the ends of the bolster the plate member 97 is flanged outwardly and upwardly to provide flanges 121 which serve to guide and properly position containers mounted upon the bolsters. At the center of the bolster in the area where the locking members 65 and 66 of the container doors 63 and 64 are located the flange 96 and the plate member 97 are reduced in height as indicated at 122, so that the bottom of the locking members 65 and 66 will clear these members as the doors are swung open. The flange 96 and the plate member 97 are tied together structurally by a plate member 123 welded to and extending across these members.

The flange 96 and plate member 97 terminate at and are welded to end plates 124 which are welded to and reinforce the ends of the bottom and upper bolster plates 95 and 100. Each end plate 124 is formed to provide an outwardly and upwardly extending flange 125 which is welded to the similar flange 121 and guides containers to proper position upon the bolsters.

Adjacent to the ends of the bolster the upper bolster plate is depressed as indicated at 126. A locking device is provided in this area by means of which containers may be fastened upon the bolster. The locking device comprises an angular member 127 having a flange 128 which is preferably downwardly inclined to the bolster plate flange 96 to which it is welded. The angular member 127 also has a vertical flange 129 which is spaced from the flange 96. Space is thereby provided for the reception of a member 130 which extends between and is welded to the flanges 96 and 129.

Member 130 has spaced upper and lower flanges 131 and 132 connected by a vertical web 133. Flange 132 extends beyond flange 131 and is flanged upward as indicated at 134 and then outward as shown at 135. A plate member 136 narrower than flanges 131 and 132 extends between and is welded to these flanges.

A sleeve 137 is disposed in alined openings 138 and 139 formed in the flange 96 and plate member 97 and is welded to these members. A locking bolt 140 is slidably and rotatably received in the sleeve. An actuating handle 141 extends through the outer end of the locking bolt.

In FIG. 11 the locking bolt is shown in its projected position. In this position the handle 141 is horizontal and a portion thereof lies behind the plate member 136. The latter accordingly prevents the bolt from sliding to retracted position. To retract the locking bolt 140 the handle 141 is rotated counterclockwise until the noted portion of the handle clears the plate member 136 whereupon the locking bolt can be slid outwardly. Rotation of the handle and the locking bolt is limited by the engagement of the noted portion of the handle with the flange 134. Retraction of the locking bolt is limited by its engagement with the flange 129. When the locking bolt is retracted the handle is swung clockwise bringing the noted portion of the handle in front of the plate member 136 which then prevents accidental projection of the locking bolt. The horizontal position of the handle is maintained by the engagement of the noted portion of the handle with the inside of flange 131.

Some containers are provided with flanges F, shown in dot and dash lines in FIG. 18, which extend along the sides of the containers at the bottom thereof. These flanges are utilized to lock the containers upon the bolsters 94. For this purpose each end of the bolster is provided with a locking dog 142. According to the instant invention portions of the bottom and upper plates 95 and 100 of the bolster adjacent to the vertical plate member 99 are removed to provide recesses 143 and 144 for receiving the locking dog. The portion of plate 100 adjacent to the recess is reinforced by an angular member 145 having a leg 146 parallel to the end of the bolster and a leg 147 which is parallel to the vertical plate member 99. Leg 147 and plate member 99 extend beyond the end of the bolster as shown in FIG. 11. The locking dog is pivotally mounted in recesses 143 and 144 between the bottom and upper bolster plates 95 and 100 by means of a pin 148 which extends into and is supported by vertical plate member 99 and leg 147.

When the locking dog 142 is in active engagement with a flange F as shown in FIG. 18 it is locked in such engagement by a sliding bolt 149. To return the locking dog to inactive position the sliding bolt 149 is retracted whereupon the locking dog swings downward into the recess 143 of the bottom plate 95.

The instant invention provides means for securely and releasably locking the bolsters upon the channels 14. This means comprises member 150 welded edgewise to the bottom of each bolster so as to depend from the bottom plate 95. Each member 150 has a web 151 extending lengthwise of the bolster and spaced flanges 152 and 153 extending crosswise thereof. Flange 153 is bent to provide a lengthwise extending flange 154 extending to vertical plate member 112 to which they are welded. A portion of flange 153 and 154 are welded to and depend from plate member 109 which provides a base for these flanges.

The flanges 152 and 153 of each member 150 are formed within alined openings within which the slidable and rotatable locking bolt 120 is received. The locking bolt is actuated by a handle 156 welded to the end thereof. A groove 157 extends into flange 153 from the bolt receiving opening formed therein to permit passage therethrough of a projection 158 formed on the bolt when the bolt is retracted to unlock the bolster.

When a bolster is placed upon the frame 81 it is guided to position upon the channels 14 by the vertical plate members 112 and 113 which lie on opposite sides of these channels. At this time the locking bolts 120 are retracted so that alinement between the sleeves 87, 118 and 119 can be established. The locking bolts 120 are rotated by the handles 156 so that the projections 158, which lie on the outside of flange 153 and out of alinement with the grooves 157, are alined with these grooves. The locking bolts are then projected through the sleeves 87, 118 and 119 and rotated so that the projections 158 are out of alinement with the grooves 157. The bolster is now locked upon the frame. The projections cooperate with the flange 153 to prevent the accidental retraction of the locking bolts. The position of the handle is maintained by its engagement with the bottom plate 95, as shown in FIG. 14. Complete retraction of the locking bolts from the members 150 is prevented by the engagement of the projections with the flanges 152.

The instant invention provides means for supporting containers between the bolsters in such a manner that the supporting means may be used when desired and will not interfere with the movement and support of trailers upon the cars. To this end a pair of spaced plates 159 is welded to web 15 and flange 16 of each channel 14. These plates are formed with alined vertically elongated holes 160 in which pins 161 are received. Strap members 162 are welded to each pin. The strap members carry channel members 163 which are reinforced by plates 164 extending between and welded to the flanges 165 and 166 of the channel members in spaced relationship to the web 167 thereof.

In inactive position the channel members 163 depend from the pins 161 and lie within the space between the flanges 16 and 17 of the channels 14. In this position they do not interfere with the movement of trailers upon the car. To support containers the channel members 163 are swung upward and seated upon the flanges 16. In this position the flanges 165 lie in the main plane of upper plate 100 of the bolsters and serve to support containers between the bolsters. One or more channel members 163 may be employed.

The bolsters 94 are removed from the frame 81 when it is desired to ship trailers on the cars so that they do not interfere with the placement of the trailers on the cars. To make the bolsters available at all times for the shipment of containers means is provided for the storage of the bolsters on the frame. For this purpose pairs of metallic straps 168 are provided in the bays between adjacent channel cross members 18 and between channel cross members 18 and I-beam cross members 19. The strap members have a horizontal portion 169, a downwardly inclined portion 170 and an upwardly inclined portion 171. The portions 169 and 171 are reinforced by gussets 172 and 173 welded to the underside of the straps. The straps extend between the webs 15 of the channel members 14 to which they and the gussets are welded.

When stored upon the straps the bolsters are seated upon the portions 171 with the flanges 96 of the bolsters abutting the portion 170 of the straps. In this position the vertical plates 112 and 113 lie on opposite sides of the straps and the locking bolts 120 are adapted to be projected through openings 174 in the gussets 173, which constitute detents for the locking bolts, to fasten the bolsters upon the straps. In stored position the bolsters do not project above the channel members 14 so as not to interfere with the placement of trailers on the cars.

Landing gear carried by the front end of trailers sometimes have low axles which would normally engage the channel members 14 of the frame 81, when the trailers are placed upon the cars for shipment thereon. In this event the wheels carried by the landing gear which should support the front end of the trailers upon the the floor of the car are spaced above the floor and the front end of the trailers are undesirably supported upon the axles. To prevent this condition the instant invention provides means which is always available for insuring support of the front end of the trailers upon the wheels of the landing gear even though the latter has a low axle.

Such means take the form of pairs of chock blocks 175 preferably chained to the channel members 14 and stored upon the frame 81 below the top of these channel members, as shown in FIG. 21. The chock blocks, which are preferably formed of metal, have a portion 176 of reduced height which rests upon a section of wood floor boards (not shown) normally provided on the car while the remainder of the chock blocks rest upon the main portion of the floor. In use a chock block is placed on the floor as indicated on the outside of each channel member 14 so that the wheels of the landing gear of a trailer will be supported upon the chock blocks and the low axle of the landing gear will be spaced above the channel members 14.

To store the chock blocks upon the frame 81 the latter is provided with spaced Z-bars 177 and 178 extending between and welded to the webs 15 of the channel members 14. The webs 179 and 180 of these Z-bars are vertical, the upper flanges 181 and 182 extending in opposite directions and the lower flanges 183 and 184 extending toward each other. In stored position the chock blocks are supported upon the flanges 183 and 184 and lie below the top of the channel members 14.

This application is a continuation-in-part of co-pending application Serial Number 110,976, filed May 18, 1961.

It will be apparent that numerous changes and modifications in the details of the invention will be clear to those skilled in the art. It is intended, therefore, that all such changes and modifications be comprehended within this invention which is to be limited only by the scope of the claims appended hereto.

I claim:

1. In a railway flat car equipped with trailer hitches hinged to the floor of the car for swinging movement longitudinally of the car and lying upon the floor when not in use, a cradle mounted upon the floor for longitudinal movement relative to said car, said cradle comprising a frame embodying side members straddling said hitches, cross members extending between and secured to said side members in spaced relationship to said hitches and cross bolsters supported upon and extending beyond said side members, means removably securing said bolsters to said side members, said bolsters lying above said hitches, said cradle being adapted to carry containers disposed with their ends supported upon said bolsters, and bolster supporting means carried by said frame between said side members and between adjacent cross members, said bolsters being removable from said side members for support and storage therebetween upon said latter means, said storage of said bolsters making the floor of said car available for supporting the wheels of trailers upon the floor of said car upon opposite sides of said cradle, said hitches being swingable upwardly between said side members to support trailers placed on said car upon removal of said bolsters and storage thereof on said storage means, whereby said bolsters are always available to support containers, said cradle becomes a permanent part of said car and said car is capable of carrying loads of containers, trailers and mixed containers and trailers.

2. A cradle for railway flat cars comprising a frame embodying spaced side members and bolsters supported upon said side members and extending crosswise thereof beyond said side members, each of said bolsters embodying a supporting plate, members secured to the underside of said plate and extending crosswise thereof adjacent to said side members, members secured to the underside of said supporting plate and extending lengthwise thereof and abutting said crosswise extending members, members secured to said side members including portions inclined downwardly and outwardly of said side members and portions extending from said inclined portions to said side members, said inclined portions abutting said crosswise extending members, said portions extending from said inclined portions to said side members being disposed relative to said lengthwise extending members to transmit stresses from the latter to said side members, and means releasably securing said bolsters to said side members.

3. A cradle for railway flat cars comprising a frame embodying spaced side members, cross members extending between and secured to the side members and bolsters removably supported upon said side members and extending crosswise thereof beyond said side members, each of said bolsters including a supporting plate, reinforcements carried by said plate, said reinforcements being secured to the underside thereof, members secured to said side members and having portions inclined downwardly and outwardly of said side members and portions extending from said inclined portions to said side members, said inclined portions abutting said reinforcements when said bolsters are placed upon the frame, said portions extending from said inclined portions to said side members transmitting stresses from said reinforcements to said side members, and means releasably securing said bolsters to said side members.

4. A cradle for railway flat cars comprising a frame embodying spaced side members and bolsters supported upon said side members and extending crosswise thereof beyond said side members, each of said bolsters including a suporting plate, reinforcements for said plate secured to the underside thereof, members secured to said side members and having portions inclined downwardly and outwardly of said side members and portions extending from said inclined portions to said side members, said inclined portions abutting said reinforcements, said portions extending from said inclined portions to said side members transmitting stresses from said reinforcements to said side members, members having keyhole shaped openings secured to the underside of said supporting plate at one side of said side members, members secured to the underside of said supporting plate on the opposite side of said side members, said latter members and said side members having openings alined with said keyhole shaped openings, and sliding locking bolts extending through said alined openings to releasably fasten said bolsters to said side members, said locking bolts having lugs projecting therefrom, said locking bolts being rotatable to aline said lugs with said keyhole shaped openings to permit retraction of said locking bolts from said side members and removal of said bolsters from said side members.

5. In a railway flat car having trailer hitches, a cradle, means mounting said cradle upon said car for longitudinal movement relative thereto, said cradle comprising a frame embodying side members straddling said hitches and spaced cross bolsters extending beyond said side members, means removably securing said bolsters upon said side members, said bolsters lying above said hitches, said cradle being adapted to carry containers having their ends supported upon said bolsters, supporting members extending between and secured to said side members below the top thereof, said bolsters being removable from said side members for storage upon said supporting members, said supporting members supporting said bolsters below the top of said side members, said storage of said bolsters making the floor of said car available for supporting the wheels of trailers upon the floor of said car upon opposite sides of said cradle, said hitches being movable between said side members to support trailers placed on said car when said bolsters are in stored position, whereby said bolsters are always available to support containers, said cradle becomes a permanent part of said car and said car is capable of carrying loads of containers, trailers and mixed containers and trailers.

6. The structure set forth in claim 5 wherein each of said bolsters comprises a plate member having an upwardly extending flange, the ends of the containers are provided with swinging doors carrying locking means extending downwardly below the doors, said flange terminates below the doors and in front of the locking means, said flange is coped in the vicinity of the locking means so as to lie below the locking means and the locking means is operable to unlock the doors and the doors are swingable to open position while the containers are supported upon said plate members.

7. The structure set forth in claim 6 wherein each of said side members has an outwardly extending flange lying above the car, said bolsters are supported upon said flanges, said bolsters support the ends of the containers with the intermediate portions of the containers spaced above said flanges, means are pivotally mounted on said side members below and inwardly of said flanges when not in use and said means are swingable upwardly upon said flanges to support the intermediate portions of the containers.

8. In a railway flat car having trailer hitches, a cradle, means mounting said crade upon said car for longitudinal movement relative thereto, said cradle comprising a frame embodying side members straddling said hitches and spaced cross bolsters extending beyond said side members, means removably securing said bolsters upon said side members, said bolsters lying above said hitches, said cradle being adapted to carry containers having their ends supported upon said bolsters, supporting members extending between and secured to said side members below the top thereof, said supporting members having a downwardly sloping portion secured to one side member, a flange extending upwardly from said sloping portion and a flange extending from said latter flange and secured to the other side member, said bolsters being removable from said side members for storage upon said supporting members, said bolsters resting upon said sloping portion of said supporting members and abutting said upwardly extending flange, said supporting members supporting said bolsters below the top of said side members, said storage of said bolsters making the floor of said car available for supporting the wheels of trailers upon the floor of said car upon opposite sides of said cradle, said hitches being movable between said side members to support trailers placed on said car when said bolsters are in stored position, whereby said bolsters are always available to support containers, said cradle becomes a permanent part of said car and said car is capable of carrying loads of containers, trailers and mixed containers and trailers.

9. In a railway flat car having trailer hitches, a cradle, means mounting said cradle upon said car for longitudinal movement relative thereto, said cradle comprising a frame embodying side members straddling said hitches and spaced cross bolsters extending beyond said side members, means carried by said bolsters removably securing said bolsters upon said side members, said bolsters lying above said hitches, said cradle being adapted to carry containers having their ends supported upon said bolsters, supporting members extending between and secured to said side members below the top thereof, detent members on said supporting members, said bolsters being removable from said side members for storage upon said supporting members, said supporting members supporting said bolsters below the top of said side members, said bolster securing means engaging said detent members to fasten said bolsters upon said supporting members, said storage of said bolsters making the floor of said car available for supporting the wheels of trailers upon the floor of said car upon opposite sides of said cradle, said hitches being movable between said side members to support trailers placed on said car when said bolsters are in stored position whereby said bolsters are always available to support containers, said cradle becomes a permanent part of said car and said car is capable of carrying loads of containers, trailers and mixed containers and trailers.

10. A cradle for railway flat cars comprising a frame embodying spaced side members and cross members extending between and secured to said side members, bolsters supported upon said side members and extending crosswise thereof beyond said side members and means releasably securing said bolsters to said side members, said bolsters including a lower plate having an upstanding flange extending along one side thereof, an upper plate spaced from said lower plate, and means extending between and maintaining said plates in spaced relation, including a member extending along the opposite side of said lower plate, said means being secured to said plates and tieing them together so that they function as a unitary stress-carrying member, a portion of the ends of said plates being removed at said opposite side to provide a recess, a reinforcing member extending between said plates at the recess, means securing said reinforcing member to said plates and said latter member, a locking dog disposed in the recess between said latter member and said reinforcing member, a pin supported by said latter member and said reinforcing member pivotally mounting said locking dog, and means engaging said latter member, said reinforcing member and said locking dog to maintain said locking dog in locking position.

References Cited in the file of this patent

UNITED STATES PATENTS

| | | |
|---|---|---|
| 1,408,413 | Smith | Feb. 28, 1922 |
| 1,408,414 | Smith | Feb. 28, 1922 |
| 1,472,078 | Lucius | Oct. 30, 1923 |
| 2,036,344 | Menhall | Apr. 7, 1936 |
| 2,471,096 | Colorigh | May 24, 1949 |
| 2,828,931 | Harvey | Apr. 1, 1958 |
| 2,973,174 | Stanwick et al. | Feb. 28, 1961 |